Patent Office 3,063,884
Patented Nov. 13, 1962

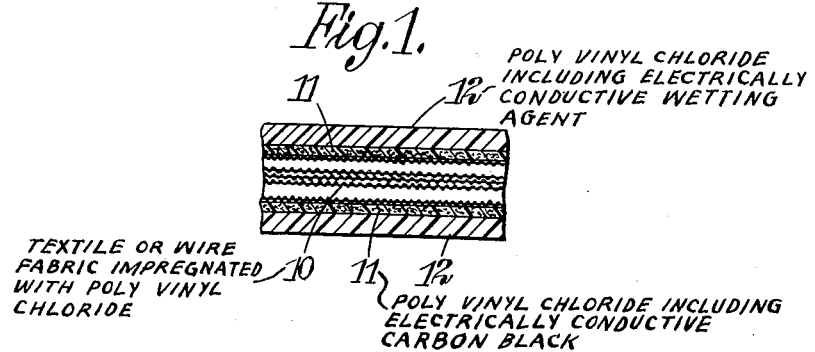
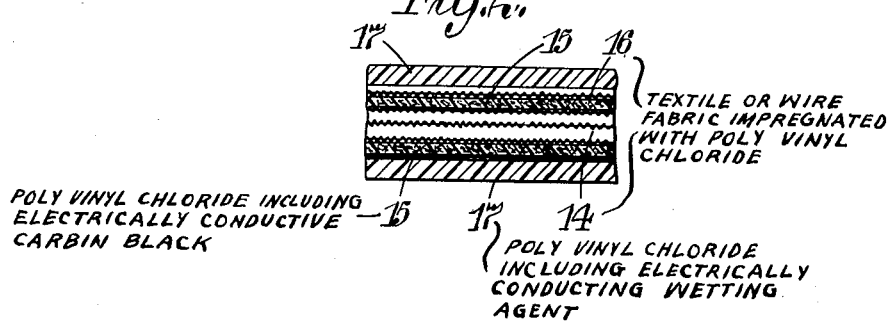

3,063,884
FLEXIBLE LAMINATED ARTICLES COMPOSED OF RUBBER OR RUBBER-LIKE MATERIALS
Wilfrid Glover, Leyland, and Richard Tudor, Burton-on-Trent, England, assignors to BTR Industries Limited (formerly British Tyre & Rubber Company Limited), London, England, a British company
Filed Mar. 11, 1958, Ser. No. 720,574
Claims priority, application Great Britain Mar. 13, 1957
3 Claims. (Cl. 154—52.1)

The invention relates to flexible laminated articles especially but not exclusively conveyor or transmission belts, comprising two or more layers each embodying rubber, which expression is used herein (unless the context requires otherwise) to include vulcanised natural rubber and synthetic rubbers such as polymers of chloroprene (neoprene), butadiene/acrylonitrile copolymers as well as rubber-like materials such as those consisting of one or more polymers or copolymers of vinyl chloride and vinylidene chloride; one or more copolymers of vinyl chloride with vinyl acetate, vinylidene chloride or acrylonitrile; one or more copolymers of vinylidene chloride with acrylonitrile; or a mixture of a polymer of vinyl chloride with butadiene/acrylonitrile or with chloroprene.

The invention is especially concerned with articles such as conveyor belts for coal mines composed of poly-vinyl chloride composition, with, usually, reinforcement of layers of fabric coated with similar material. It is however also applicable to articles such as transmission belts which comprise one or more layers of fabric impregnated or coated with natural or synthetic rubber.

It is well known that articles composed of or containing rubber, as above defined, tend to accumulate static electricity and that for certain uses (e.g. in coal mines) such accumulations are highly undesirable. Accumulations of static electricity can be avoided if the articles are made sufficiently electrically conductive (e.g. a volume resistivity not greater than $3 \times 10^8$ ohms cms.) and it is known that such conductivity can be achieved by the addition in the course of the mixing process of conductive carbon black (channel or furnace) to the rubber. Such additions have however various practical disadvantages which include loss of flexibility, excessive hardness of the product and the production of highly polished surfaces on the product which may be undesirable in, for example, a conveyor belt. The addition of carbon black to gelled polyvinyl chloride composition also introduces manipulative difficulties in manufacture.

It is also known that conductivity can be given to rubber by the addition thereto of a surface active wetting agent but difficulties are found in obtaining consistent results and sufficient conductivity.

According to the present invention a flexible laminated article embodying rubber as above defined is constructed in at least two layers comprising an outer or surface layer of rubber rendered sufficiently conductive for dissipation of static electricity by the addition of a surface active wetting agent and an inner or under layer of rubber containing conductive carbon black, the two layers being in mutually conductive relation.

The layers may embody the same or different materials included in the term rubber as above defined or a mixture of such materials.

The black-containing layer may be thin (e.g. about 0.010″ to 0.012″ thick) thereby avoiding undue stiffness and reducing to a low value the volume required of the black-containing compound which, as already mentioned, is difficult to prepare. In the case of a reinforced belt or other article composed of cover and carcass plies the black-containing layer may be applied as calendered sheet to the cover or carcass ply, whichever is more convenient.

In the case of a conveyor belt, the belt may comprise a carcass embodying one or more layers of textile fabric reinforcement embedded in poly-vinyl chloride composition or like plastic material which may contain a wetting agent, and one or more cover layers, which may also be of poly-vinyl chloride composition, and of which at least one contains a wetting agent. The carbon-black-containing layer may be between the cover layer (or one of them) and the carcass or it may be within the carcass (e.g. beneath the outer layer of reinforcement). Further the black-containing layer may itself contain reinforcement (e.g. of textile fabric).

It is an advantage of the invention, especially where the carbon-black-containing layer is in or immediately beneath an outer layer of reinforcement which is itself beneath a cover layer, that should the cover layer be scuffed or worn off in service, the black-containing layer will still provide a conductive path.

The carbon-black-containing layer or the wetting-agent-containing layer may be one of the normal layers of a laminated article or it may be an additional layer or an article which is not normally laminated may be constructed in two or more layers for the purposes of the invention.

The wetting agents which may be used include poly-ethylene glycol laurates and oleates such as those sold under the trade name of "Estax 38" and a chemical composition sold under the symbols "AL5" or those of the sulphonated fatty alcohol, the sulphonated Lorol and the alkyl aryl types. One agent which may be used is the paste known under the registered trademark "Vulcastab L.S." Other agents which may be used include the quaternary ammonium salts with an organic ion such as ethyl sulphate, known as Quertons: and the cationic agents known as Druspin PF, Drustat F and Drustat H, and having ethyl sulphate as an organic ion.

Specific examples of poly-vinyl chloride composition suitable respectively for the outer layer and the inner carbon-black-containing layer are:

Outer Layer Composition

| | |
|---|---|
| P.V.C. polymer (Geon 101) | 100.00 |
| Tri-xylenyl phosphate plasticiser | 69.25 |
| Di-alphanyl phthalate plasticiser | 31.25 |
| Lead stabiliser paste dispersion | 7.00 |
| Wetting agent | 11.00 |
| | 218.50 |

The wetting agent may, for example, be that marketed under the name "Negomel AL5."

Inner Carbon-Black-Containing Layer Composition

| | |
|---|---|
| P.V.C. polymer (Geon 101) | 100.0 |
| Tri-xylenyl phosphate plasticiser | 72.0 |
| Di-alphanyl phthalate plasticiser | 45.5 |
| Lead stabiliser paste dispersion | 9.0 |
| Conductive carbon black | 75.5 |
| | 302.0 |

The carbon black may, for example, be that marketed under the name "Vulcan XXX."

The accompanying diagrammatic drawings show in section two specific constructions of belts according to the invention by way of example.

In FIGURE 1 the belt consists of a multi-ply carcass 10 composed of reinforcement coated or impregnated with poly-vinyl composition, a layer 11 of poly-vinyl chloride composition containing carbon black as the above example and an outer cover 12 of poly-vinyl chloride composition containing a wetting agent and of the composition set out above.

In FIGURE 2 the belt consists of a multi-ply carcass composed of reinforcement 14 coated or impregnated with poly-vinyl chloride composition, a layer 15 of poly-vinyl chloride composition containing carbon black, a layer 16 of reinforcement on top of the layer 15 and an outer cover 17 of poly-vinyl chloride composition containing a wetting agent, the cover material being in contact with the layer 15, through the reinforcement.

In each of the above constructions the reinforcement may be of textile fabric impregnated with the poly-vinyl chloride composition or it may be formed of longitudinally extending cords or metal wires or woven or otherwise arranged cords or wires.

The carbon black layer may be prepared as described in U.S. patent application No. 657,037, now abandoned.

We claim:

1. A flexible laminated fabric-reinforced belt comprising a body of rubber material with fabric reinforcing plies embedded therein, an outer surface layer of rubber containing a surface active wetting agent to render said layer electrically conductive, and an inner under surface layer of rubber containing conductive carbon black to render said layer electrically conductive, said under layer forming a portion of said body and being appreciably thinner than said cover and thinner than said body and being joined in electrically conductive relation to said outer layer.

2. An article as defined in claim 1 in which said under layer containing said carbon black is from 0.010 to 0.012 inch thick.

3. A conveyor belt comprising a flexible laminated fabric-reinforced carcass of poly-vinyl chloride composition, an outer surface layer of poly-vinyl chloride composition forming the pulley-engaging face of said belt which composition of the outer layer contains a minor proportion of a wetting agent to render said layer electrically conductive, and an inner under-surface layer of poly-vinyl chloride composition containing carbon black to render said layer electrically conductive, said under-surface layer forming a portion of said carcass and being appreciably thinner than said cover layer and also thinner than said carcass portion and being joined throughout substantially the entire area thereof in electrically conductive relation to said outer layer.

References Cited in the file of this patent

UNITED STATES PATENTS

| | | |
|---|---|---|
| 1,899,535 | Teague | Feb. 28, 1933 |
| 2,341,360 | Bulgin | Feb. 8, 1944 |
| 2,379,976 | Maddock | July 10, 1945 |
| 2,441,945 | Frolich et al. | May 25, 1948 |
| 2,729,770 | Robbins | Jan. 3, 1956 |